Patented June 5, 1934

1,962,103

UNITED STATES PATENT OFFICE 1,962,103

REFINING HYDROCARBON OILS

Howard H. Gross, Beacon, N. Y., assignor to The Texas Company, New York, N. Y., a corporation of Delaware No Drawing. Application September 16, 1932, Serial No. 633,460

4 Claims. (Cl. 196—13)

This invention relates to refining hydrocarbon oils by solvent extraction.

The invention contemplates the treatment and purification of hydrocarbon oils by extraction with a solvent selected from a heterocyclic hydrocarbon compound or a derivative thereof of the type, such as furfural, and more particularly to an isomer of ordinary furfural which is characterized by its stability and resistance to auto-oxidation. The invention contemplates particularly treating hydrocarbon oils with 3-furfural whereby unsaturated compounds, gum-forming bodies, sulphur-bearing compounds, and other undesired constituents including aromatic substances may be extracted from the oil.

Solvent liquids of the type such as 3-furfural are adapted to the purification of mineral oils on account of the selective solvent action between various constituents of the oil at ordinary temperatures for the production therefrom of finished merchantable products. This solvent is sufficiently selective in its solvent action to adapt it to the preparation of petroleum products of uniform character irrespective of the crude source; thus, for example, lubricating oil products of equal quality as regards lubricating characteristics may be prepared from crudes obtained from entirely different fields.

I have found that 3-furfural or 3-furaldehyde, which is an isomer of the ordinary furfural, particularly suitable for purifying petroleum oils on account of its stable nature and its resistance to oxidation.

These improved qualities are of particular importance as regards refining petroleum fractions which in themselves possess resin or sludge-forming tendencies, and which latter may be catalyzed or promoted to some extent as a result of treatment with an unstable reagent.

My invention comprises treatment of various fractions derived from crude petroleum including naphthas, kerosenes or lubricating oil fractions, as well as asphaltic fractions, with 3-furfural or a derivative thereof of substantially similar character and having similar solvent properties.

Thus, my invention includes the purification of cracked naphtha by treating it with a solvent liquid comprising 3-furfural to extract undesirable sulphur compounds and gum-forming bodies and produce a motor fuel product of less color and gum-forming tendencies without necessarily subjecting the naphtha to the usual acid treatment heretofore required.

Cracked naphthas, such as obtained from the cracking processes, now in general use, contain readily oxidizable constituents. It is, therefore, of particular advantage to employ as the treating agent a solvent liquid, such as I propose, which is itself free from any tendencies to form resinous products which would promote or catalyze the conversion of otherwise valuable constituents of the naphtha or oil undergoing treatment into undesirable or waste material.

Similarly, this type of solvent is equally well adapted to the treatment and purification of lubricating oil fractions whereby undesired constituents including those of low viscosity index may be selectively removed from the oil to produce lubricants of superior lubricating value.

The treatment may be carried out in batch or preferably by continuous countercurrent extraction and under suitable conditions of temperature and concentration to effect the particular degree of extraction desired.

Extraction temperatures of as low as 0° F. may be found desirable and also as high as 200° F. or more. For example, in the treatment of naphtha, the temperature of extraction may be carried out at around 70° or 80° F., or at temperatures below that at which substantial vaporization of the naphtha would occur. In the case of lubricating oil fractions, on the other hand, higher temperatures may be employed.

The degree or extent of extraction may also be varied by varying the ratio of solvent liquid to oil undergoing treatment; for example, in treating a lubricating distillate oil of around 75 Saybolt universal seconds at 210° F. the oil may be mixed with 3-furfural in the ratio of about one part of oil to two parts of solvent and the treatment carried out with intimate mixing at a temperature of around 180° F. Following this, the mixture is allowed to stand, settling out into two layers, the top layer comprising treated oil and a relatively small amount of solvent and the lower layer comprising extracted constituents dissolved in a relatively large proportion of solvent. The solvent may be recovered from the oil and extract portions by vaporization or distillation, or by displacement of the dissolved oil with water or some other suitable liquid-displacing medium, such as a light hydrocarbon. Last traces of the solvent may be removed by washing with sodium bisulphite solution.

In the case of lubricating oil manufacture, particularly from wax-bearing hydrocarbons, the refining treatment with 3-furfural may be advantageously carried out after removal of the wax. However, the refining treatment may precede such wax removal if desired, or may be carried out in conjunction with the dewaxing operation whereby the furfural may serve as a dewaxing solvent.

Under ordinary conditions, the extraction treatment with a reagent comprising 3-furfural which is described herein may be applied to a raw distillate oil to produce a finished merchantable product. For example, in the case of treating unrefined lubricating oil stock, the 3-furfural refined stock may be distilled under vacuum advantageously in the presence of caustic soda or other alkaline material, to produce finished lubricating oil.

However, in the case of oils of exceedingly high sulphur content or unusual characteristics as regards tendency to form gum, it may be found desirable to supplement the furfural treatment by the usual acid, alkali and doctor treatment applied either before or after the furfural treatment.

While 3-furfural may be used alone, as described above, it is of advantage in many instances, depending on the nature of the products desired as well as upon the crude source, to employ it in admixture with a modifying solvent material; for example, with ketones, alcohols, phenols, ethers, aldehydes, homologs of benzol, and liquid sulphur dioxide and the like in varying proportions, depending upon the selective solvent action required.

Although the extraction treatment with a solvent material comprising 3-furfural has been discussed in connection with the treatment of oil such as cracked petroleum, naphthas, lubricating oil fractions and the like, the method of treatment is also applicable to other types of oil, such for example as straight run naphthas from crude oils of asphaltic characteristics. It is also applicable for the treatment of shale oils as well as to hydrogenation products resulting from the hydrogenation of carbonaceous materials or mineral oils including liquid or solid hydrocarbon fractions derived from mineral oil.

Obviously many modifications and variations of the invention, as hereinbefore set forth, may be made without departing from the spirit and scope thereof, and therefore only such limitations should be imposed as are indicated in the appended claims.

I claim:
1. The method of refining hydrocarbon oil to remove undesired constituents including sulphur compounds, carbon and sludge-forming bodies which comprises extracting said constituents from the oil with 3-furfural.

2. The method of refining hydrocarbon oil to remove undesired constituents including sulphur compounds, carbon and sludge-forming bodies which comprises extracting said constituents from the oil with a solvent comprising mainly 3-furfural.

3. In the manufacture of lubricating oil from mineral oil containing low viscosity index and high viscosity index constituents, the process comprising extracting the oil with 3-furfural, whereby the oil is separated into fractions respectively richer in low viscosity index and high viscosity index constituents.

4. In the manufacture of lubricating oil from mineral oil containing low viscosity index and high viscosity index constituents, the process comprising extracting the oil with 3-furfural in the presence of a modifying solvent liquid, having relatively less selective solvent action than 3-furfural as between low viscosity index and high viscosity index constituents, the solvent liquids being mixed with the oil in suitable proportions whereby the oil is separated into desired fractions of differing viscosity indices.

HOWARD H. GROSS.